(12) United States Patent
Yoon et al.

(10) Patent No.: US 10,449,910 B2
(45) Date of Patent: Oct. 22, 2019

(54) FIXING APPARATUS FOR CARRIER FOR VEHICLES

(71) Applicants: Il Shik Yoon, Seoul (KR); Jun Chan Yoon, Seoul (KR)

(72) Inventors: Il Shik Yoon, Seoul (KR); Jun Chan Yoon, Seoul (KR)

( * ) Notice: Subject to any disclaimer, the term of this patent is extended or adjusted under 35 U.S.C. 154(b) by 0 days.

(21) Appl. No.: 16/085,468

(22) PCT Filed: Nov. 15, 2016

(86) PCT No.: PCT/KR2016/013122
§ 371 (c)(1),
(2) Date: Sep. 14, 2018

(87) PCT Pub. No.: WO2017/159958
PCT Pub. Date: Sep. 21, 2017

(65) Prior Publication Data
US 2019/0084489 A1 Mar. 21, 2019

(30) Foreign Application Priority Data

Mar. 18, 2016 (KR) .......................... 10-2016-0032761

(51) Int. Cl.
*B60R 9/10* (2006.01)
*B60R 9/058* (2006.01)
*B60R 9/06* (2006.01)

(52) U.S. Cl.
CPC ................ *B60R 9/058* (2013.01); *B60R 9/06* (2013.01); *B60R 9/10* (2013.01)

(58) Field of Classification Search
CPC ................ B60R 9/04; B60R 9/06; B60R 9/10
(Continued)

(56) References Cited

U.S. PATENT DOCUMENTS 3,437,248 A * 4/1969 Allen ........................ B60R 9/10
224/513
4,265,382 A * 5/1981 Edwards ................... B60R 9/06
224/309
(Continued)

FOREIGN PATENT DOCUMENTS

CA    2237800 A1 * 11/1999 ............. B60R 9/042
DE    10308062 A1 * 9/2004 ............... B60R 9/06
(Continued)

OTHER PUBLICATIONS

International Search Report dated Feb. 15, 2017 for PCT/KR2016/013122.

*Primary Examiner* — Justin M Larson

(57) ABSTRACT

The present invention relates to a fixing apparatus for quickly and simply fixing a carrier for vehicles to a vehicle, the fixing apparatus including: a female coupler which is installed in the vicinity of a rotating wheel at an end portion of an article mount; and a male coupler which is fixed to a roof of the vehicle and detachably coupled to the female coupler, in which when a trunk of the vehicle is opened in a state in which the carrier is installed, the article mount moves forward toward a front side of the vehicle, the female coupler is separated from the male coupler, and the rotating wheel rolls along a roof of the vehicle, and when the trunk is closed, the article mount moves rearward, and the female coupler engages with the male coupler, such that the carrier is fixed to the vehicle.

7 Claims, 3 Drawing Sheets

2A1  2A2

(58) Field of Classification Search
USPC .................... 224/309, 924; D12/407, 408
See application file for complete search history.

(56) References Cited

U.S. PATENT DOCUMENTS

| | | | | |
|---|---|---|---|---|
| 5,476,201 A * | 12/1995 | Hall | .......... | B60R 9/10 |
| | | | | 224/309 |
| 5,560,525 A * | 10/1996 | Grohmann | ............ | B60R 9/06 |
| | | | | 224/282 |
| 5,690,259 A * | 11/1997 | Montani | ............ | B60R 9/042 |
| | | | | 224/310 |
| 5,749,694 A * | 5/1998 | Ackerman | ............ | B60R 9/06 |
| | | | | 224/482 |
| 7,232,170 B2 * | 6/2007 | Watson | ............ | B60R 9/06 |
| | | | | 224/310 |
| 7,469,806 B2 * | 12/2008 | Garoffolo | ............ | B60R 9/042 |
| | | | | 224/310 |
| 9,434,320 B2 * | 9/2016 | Peck | ............ | B60R 9/10 |
| 10,239,461 B1 * | 3/2019 | Yoon | ............ | B60R 9/058 |
| 10,246,027 B2 * | 4/2019 | Yoon | ............ | B60R 9/06 |
| 2007/0102464 A1 * | 5/2007 | Garoffolo | ............ | B60R 9/042 |
| | | | | 224/310 |
| 2018/0272956 A1 * | 9/2018 | Yoon | ............ | B60R 9/10 |
| 2019/0084489 A1 * | 3/2019 | Yoon | ............ | B60R 9/06 |

FOREIGN PATENT DOCUMENTS

| | | | | |
|---|---|---|---|---|
| DE | 10342177 A1 * | 4/2005 | ............ | B60R 9/06 |
| JP | 2001-140569 | 5/2001 | | |
| JP | 2002-274275 | 9/2002 | | |
| KR | 20-0412701 | 3/2006 | | |
| KR | 10-1323856 | 10/2013 | | |
| KR | 10-1550168 | 9/2015 | | |

* cited by examiner

1A1  1A2

2A1  2A2

FIXING APPARATUS FOR CARRIER FOR VEHICLES

This application claims the priority of Korean Patent Application No. 10-2016-0032761, filed on Mar. 18, 2016 in the KIPO (Korean Intellectual Property Office), the disclosure of which is incorporated herein entirely by reference. Further, this application is the National Stage application of International Application No. PCT/KR2016/013122, filed Nov. 15, 2016, which designates the United States and was published in Korean. Each of these applications is hereby incorporated by reference in their entirety into the present application.

TECHNICAL FIELD

The present invention relates to a fixing apparatus for a carrier for vehicles, and particularly, to a fixing apparatus for quickly and simply fixing a carrier for vehicles to a vehicle.

BACKGROUND ART

Recently, various carriers for vehicles are being developed in order to mount and carry a bicycle, a snowboard, or a heavy article on an outer portion of a vehicle. However, because most of the carriers in the related art need to be attached to or detached from the vehicle by using a complicated device, there are problems in that a lot of time is required for users to install and separate the carriers, and a process of installing and separating the carriers is complicated.

DISCLOSURE OF THE INVENTION

Technical Problem

The present invention has been contrived in consideration of the problems, and a main object thereof is to provide an apparatus which enables a carrier to be simply fixed to or separated from a vehicle by an operation of opening and closing a trunk of the vehicle without using a separate fixing apparatus and allows the carrier to be stably fixed without swaying even though the vehicle stops or starts suddenly, impact occurs, or the vehicle travels at a high speed.

Another object of the present invention is to provide an apparatus which enables a carrier to be quickly and simply fixed to a trunk of a vehicle and enables an angle of the carrier to be simply adjusted in accordance with vehicle properties.

Technical Solution

To achieve the aforementioned objects, the present invention provides a fixing apparatus for a carrier for vehicle, which is configured to detachably fix a carrier for vehicles to a vehicle, the carrier including: one or two vertical supports which are supported on a rear surface of a trunk of the vehicle; a horizontal support which is connected to the vertical support while having a fixed angle with respect to the vertical support and supported on an upper surface of the trunk of the vehicle; an article mount which is rotatably connected to the vertical support or the horizontal support, has a generally U shape, and has a rotating wheel installed at one end portion thereof to support an article; and an article stand which is rotatably connected to the vertical support or the horizontal support and is fixed at a right angle with respect to the article mount to support the article, the fixing apparatus including: a female coupler which is installed in the vicinity of a rotating wheel 48 at an end portion of the article mount; and a male coupler which is fixed to a roof of the vehicle and detachably coupled to the female coupler, in which when a trunk of the vehicle is opened in a state in which the carrier is installed, the article mount moves forward toward a front side of the vehicle, the female coupler is separated from the male coupler, and the rotating wheel 48 rolls along a roof of the vehicle, and when the trunk is closed, the article mount moves rearward, and the female coupler engages with the male coupler, such that the carrier is fixed to the vehicle.

In the fixing apparatus for a carrier for vehicles according to the present invention, the female coupler may include a loop having an inlet opened to a rear side of the vehicle, the male coupler may include fixing stands installed at both sides of the roof of the vehicle at an interval, and a horizontal bar fixed to the two fixing stands so as to be spaced apart from the roof of the vehicle, and the loop may engage with the horizontal bar.

Otherwise, the female coupler may include a connecting bar horizontally fixed to the article mount, and a guide at an end portion of the connecting bar, the guide may have a groove, the male coupler may include a loop fixing stand in the form of a loop fixed to the roof of the vehicle, and the groove of the guide may engage with the loop of the loop fixing stand.

In the present invention configured as described above, a U-shaped angle fixing stand may be slidably installed at a right angle on the article mount, an angle stand may be slidably installed on the horizontal support, a fixing groove, to which the angle fixing stand is coupled, may be formed in an upper surface of the angle stand, one end portion of a first fixing strap, which holds the angle fixing stand engaging with the fixing groove so that the angle fixing stand is not moved, may be connected to the angle fixing stand or the angle stand, and the other end portion of the first fixing strap may be exposed to the outside of the carrier through the angle stand and the vertical support and then fixed manually.

In this case, a second fixing strap having a loop, which is disposed at one end portion of the second fixing strap and fastened to an upper edge portion of the trunk of the vehicle, may pass through the horizontal support, and the other end portion of the second fixing strap may be exposed to the outside of the carrier and then fixed manually.

Advantageous Effects

According to the fixing apparatus for a carrier according to the present invention configured as described above, the carrier may be stably fixed without swaying or a complicated device even under any adverse condition, for example, sudden acceleration and deceleration, impact occurring when the vehicle passes over a speed bump, and an influence by wind outside the vehicle, and several fixing straps exposed to the outside of the carrier may be easily handled.

BRIEF DESCRIPTION OF THE DRAWINGS

FIG. 1A is an enlarged view of a coupled state of part A in FIG. 1, in which FIG. 1A1 is an enlarged view of a coupled state of part A in FIG. 1, and FIG. 1A2 is an enlarged view of a separated state of part A in FIG. 1.

FIG. 2 is a perspective view of a second exemplary embodiment of the fixing apparatus for a carrier according to the present invention.

FIG. 2A in is an enlarged view of a coupled state of part A' in FIG. 2, in which FIG. 2A1 is an enlarged view of a coupled state of part A' in FIG. 2, and FIG. 2A2 is an enlarged view of a separated state of part A' in FIG. 2.

MODE FOR CARRYING OUT THE INVENTION

Figure 1:
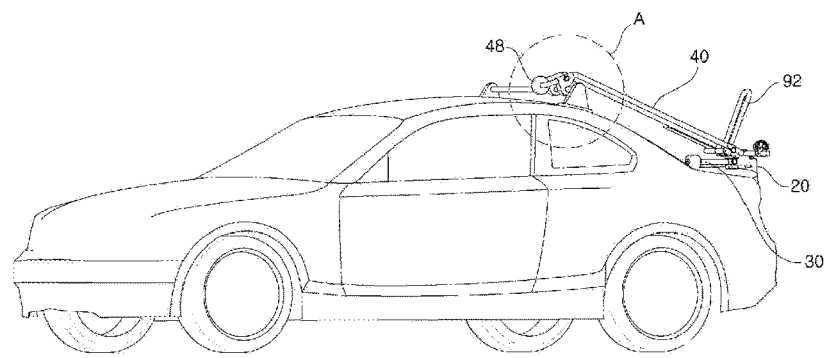
FIG. 1 is a perspective view of a first exemplary embodiment of a fixing apparatus for a carrier for vehicles according to the present invention.
Figure 1A:
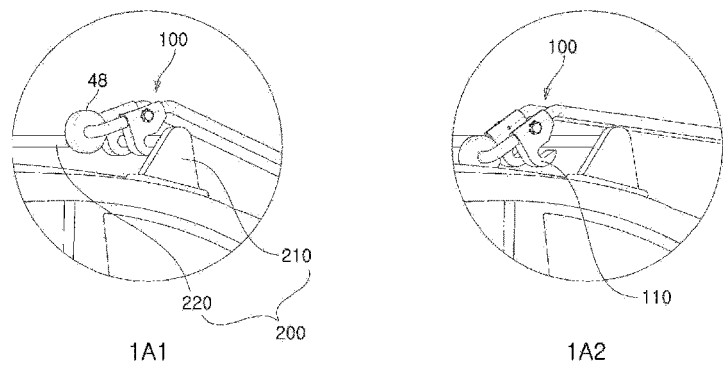
Figure 2:
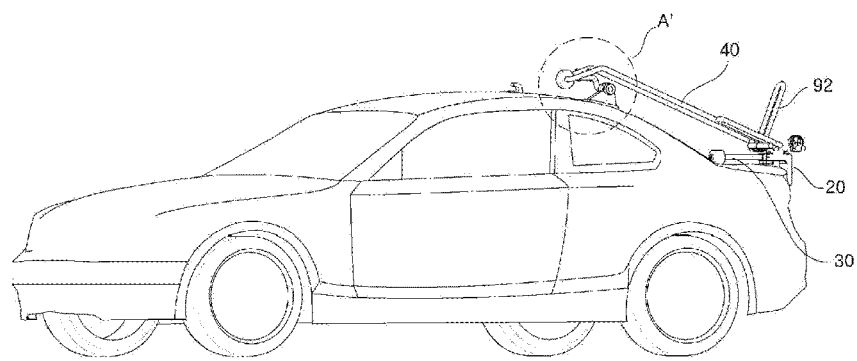

FIG. 1 illustrates a first exemplary embodiment of a fixing apparatus for a carrier for vehicles according to the present invention. FIG. 1A is an enlarged view of a coupled state of part A in FIG. 1, in which FIG. 1A1 is an enlarged view of a coupled state of part A in FIG. 1, and FIG. 1A2 is an enlarged view of a separated state of part A in FIG. 1.

Basically, a carrier, which is supported on a rear surface of a trunk of a vehicle, includes one or two vertical supports 20, a horizontal support 30 which is connected to the vertical support 20 while having a fixed angle with respect to the vertical support 20 and supported on an upper surface of the trunk of the vehicle, an article mount 40 which is rotatably connected to the vertical support or the horizontal support, has a generally U shape, and has a rotating wheel 48 installed at one end portion thereof to support an article, and an article stand 92 which is rotatably connected to the vertical support or the horizontal support and is fixed at a right angle with respect to the article mount 40 to support the article.

The fixing apparatus for a carrier according to the present invention basically includes a female coupler 100 which is installed in the vicinity of the rotating wheel 48 at the end portion of the article mount 40, and a male coupler 200 which is fixed to a roof of the vehicle and detachably coupled to the female coupler 100.

According to the first exemplary embodiment in FIG. 1, the female coupler 100 includes a loop 110 having an inlet opened toward a rear side of the vehicle, and the male coupler 200 includes two fixing stands 210 which are installed at both sides of the roof of the vehicle at an interval, and a horizontal bar 220 which is fixed to the two fixing stands 210 so as to be spaced apart from the roof of the vehicle. The two loops 110 may be installed at an immediately rear side of the rotating wheel 48 on two support rods of the article support 40, respectively, one on each support rod, but only the single loop 110 may be installed in some instances. When the trunk is closed in the state in which the carrier is installed, the loop 110 engages with the horizontal bar 220 in a male-female connection manner, as illustrated in FIG. 1A1.

When the trunk of the vehicle is opened in the state in which the carrier is installed, the article mount 40 moves forward toward a front side of the vehicle as illustrated in FIG. 1A2, such that the female coupler 100 is separated from the male coupler 200, and the rotating wheel 48 rolls along the roof of the vehicle.

Figure 2A:
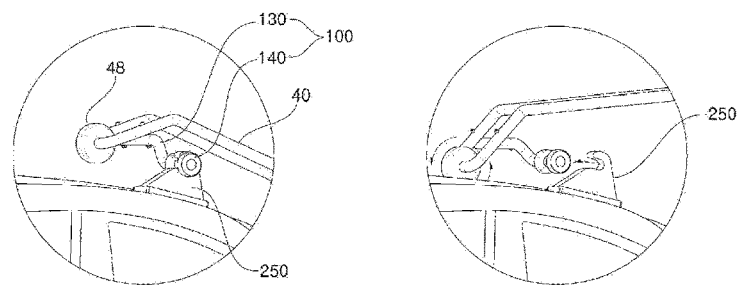

FIG. 2 illustrates a second exemplary embodiment of the fixing apparatus for a carrier according to the present invention. FIG. 2A in is an enlarged view of a coupled state of part A' in FIG. 2, in which FIG. 2A1 is an enlarged view of a coupled state of part A' in FIG. 2, and FIG. 2A2 is an enlarged view of a separated state of part A' in FIG. 2.

In the present exemplary embodiment, the female coupler 100 includes a connecting bar 130 which is horizontally fixed on the article mount 40, and a guide 140 which is positioned at an end portion of the connecting bar, and the guide 140 has a groove. As illustrated, the connecting bar 130 may have an appropriately curved shape as necessary. In addition, the male coupler 200 includes a loop fixing stand 250 in the form of a loop fixed to the roof of the vehicle, and the groove of the guide 140 may engage with the loop of the loop fixing stand 250 in a male-female connection manner. The configuration in which the two couplers are separated or coupled by opening or closing the trunk is the same as that in the first exemplary embodiment.

The female coupler and the male coupler, which are described above, are just illustrative, and the female and male functions may be switched.

Figure 3:
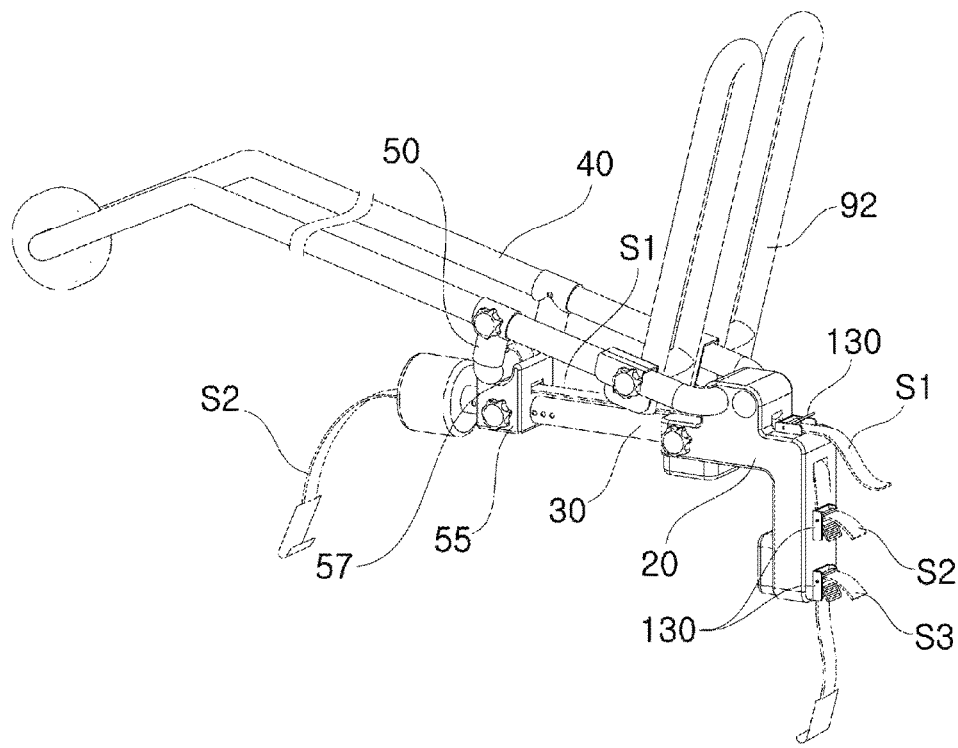
FIG. 3 is a perspective view illustrating a fixed state of a fixing structure for fixing a carrier to a vehicle.
Figure 4:
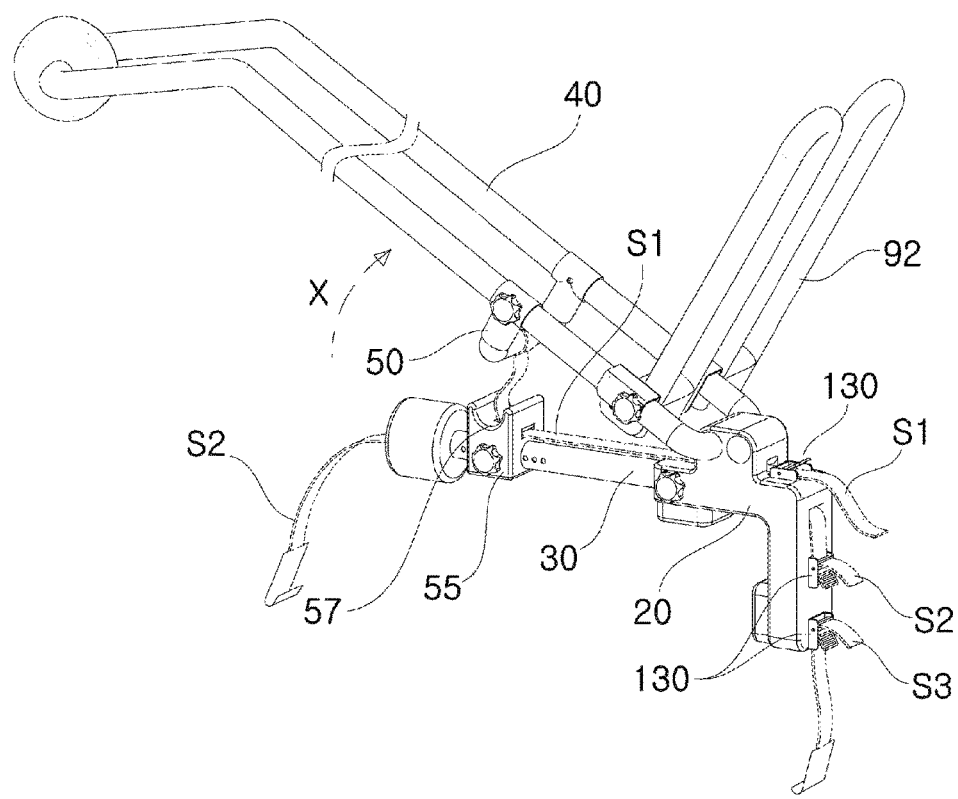
FIG. 4 is a perspective view illustrating a state in which the carrier in FIG. 3 is released.

FIG. 3 is a perspective view illustrating a fixed state of a fixing structure for fixing a carrier to a vehicle, and FIG. 4 is a perspective view illustrating a state in which the carrier is released.

Figure 5:
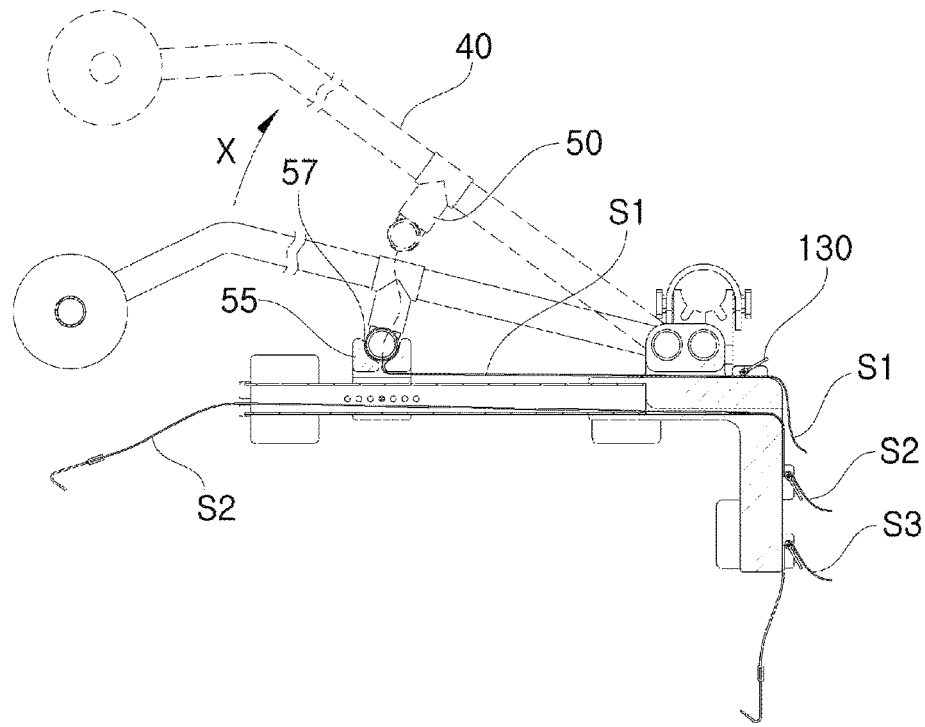
FIGS. 5 and 6 are cross-sectional side views of the exemplary embodiments in FIGS. 3 and 4.
Figure 6:
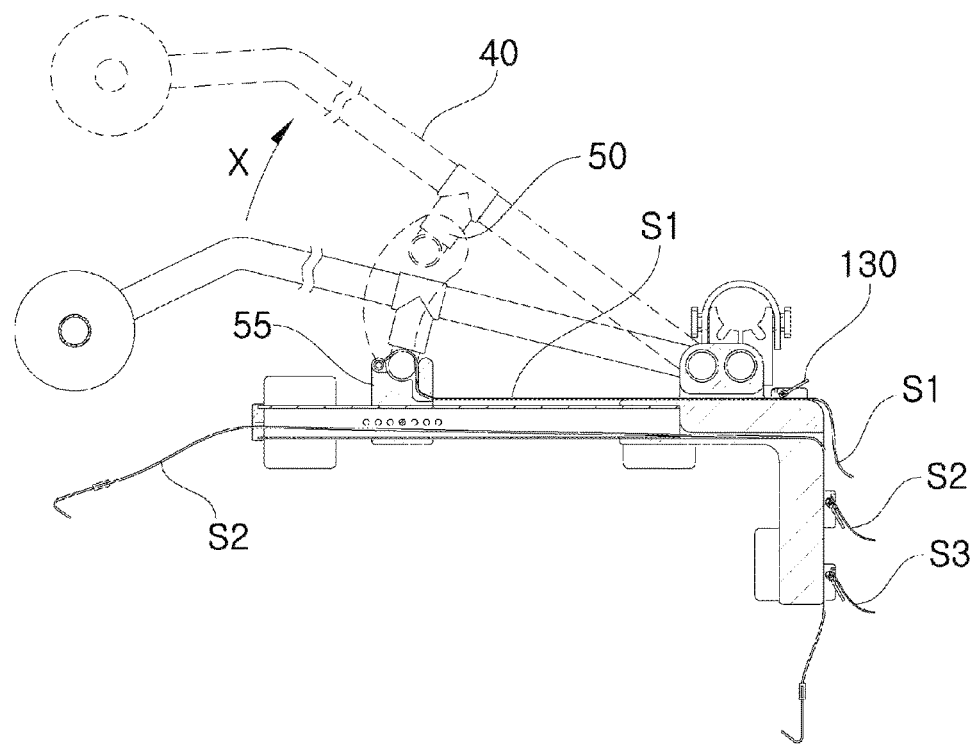

In addition, FIGS. 5 and 6 are cross-sectional side views illustrating a state in which the article stand 92 in the exemplary embodiment in FIGS. 3 and 4 is folded.

As illustrated, a U-shaped angle fixing stand 50 is slidably installed at a right angle on the article mount 40, an angle stand 55 is slidably installed on the horizontal support 30, and a fixing groove 57, to which the angle fixing stand 50 is coupled, is formed in an upper surface of the angle stand 55. In the fixed state in FIG. 3, the angle fixing stand 50 engages with the fixing groove 57 of the angle stand 55.

The angle fixing stand 50, which engages with the fixing groove 57 of the angle stand 55, needs to be securely fixed so as not to move while the vehicle travels.

To this end, as illustrated in FIG. 5, one end portion of a first fixing strap S1, which holds the engaged angle stand 55 so that the angle stand 55 is not moved, is connected to the angle fixing stand 50, and the other end portion of the first fixing strap S1 is exposed to the outside of the carrier through the angle stand 55 and the vertical support 20. The first fixing strap S1, which is exposed to the outside, may be simply and securely fixed to have a desired length by using a clip-type belt locking device 130. When the belt locking device 130 is released, the article mount 40 may be lifted up in the direction of the arrow X and simply moved to a releasing position indicated by the broken line (see FIG. 4).

Meanwhile, as illustrated in FIG. 6, one end portion of the first fixing strap S1 may be connected to the angle stand 55 instead of the angle fixing stand 50. Even in this case, the first fixing strap S1 is moved as indicated by the broken line when the belt locking device 130 is released and the article mount 40 is simply lifted up in the direction of the arrow X, and as a result, the article mount 40 may be simply unlocked and locked.

The horizontal support 30 and the vertical support 20 of the carrier according to the present invention are fixed by fastening loops of fixing straps to an upper edge portion and a lower edge portion of the trunk of the vehicle, respectively. According to the present invention, a second fixing strap S2 having the loop, which is disposed at one end portion of the second fixing strap S2 and fastened to the upper edge portion of the trunk of the vehicle, may pass through the horizontal support 30, the other end portion of the second fixing strap S2 may be exposed to the outside of the carrier, and then the second fixing strap S2 may be simply and securely fixed by using a belt locking device that has the same structure as the aforementioned belt locking device 130. Another fixing strap S3, which is fixed to the lower edge portion of the trunk, may also be simply fixed by using the belt locking device 130 having the same structure.

Of course, in some instances, a belt fixing apparatus, which has a structure different from the structure of the clip-type belt fixing apparatus, may be used.

The invention claimed is:

1. A fixing apparatus for a carrier for vehicles, which is configured to detachably fix a carrier for vehicles to a vehicle, the carrier comprising: one or two vertical supports which are supported on a rear surface of a trunk of the vehicle; a horizontal support which is connected to the vertical support while having a fixed angle with respect to the vertical support and supported on an upper surface of the trunk of the vehicle; an article mount which is rotatably connected to the vertical support or the horizontal support, has a generally U shape, and has a rotating wheel installed at one end portion thereof to support an article; and an article stand which is rotatably connected to the vertical support or the horizontal support and is fixed at a right angle with respect to the article mount to support the article, the fixing apparatus comprising:
- a female coupler which is installed in the vicinity of the rotating wheel at the end portion of the article mount; and
- a male coupler which is fixed to a roof of the vehicle and detachably coupled to the female coupler,
- wherein when the trunk of the vehicle is opened in a state in which the carrier is installed, the article mount moves forward toward a front side of the vehicle, the female coupler is separated from the male coupler, and the rotating wheel 48 rolls along a roof of the vehicle, and when the trunk is closed, the article mount moves rearward, and the female coupler engages with the male coupler, such that the carrier is fixed to the vehicle.

2. The fixing apparatus of claim 1, wherein the female coupler includes a loop having an inlet opened to a rear side of the vehicle, the male coupler includes fixing stands installed at both sides of the roof of the vehicle at an interval, and a horizontal bar fixed to the two fixing stands so as to be spaced apart from the roof of the vehicle, and the loop engages with the horizontal bar.

3. The fixing apparatus of claim 1, wherein the female coupler includes a connecting bar horizontally fixed to the article mount, and a guide at an end portion of the connecting bar, the guide has a groove, the male coupler includes a loop fixing stand in the form of a loop fixed to the roof of the vehicle, and the groove of the guide engages with the loop of the loop fixing stand.

4. The fixing apparatus of claim 1, wherein a U-shaped angle fixing stand is slidably installed at a right angle on the article mount, an angle stand is slidably installed on the horizontal support, a fixing groove, to which the angle fixing stand is coupled, is formed in an upper surface of the angle stand, one end portion of a first fixing strap, which holds the angle fixing stand engaging with the fixing groove so that the angle fixing stand is not moved, is connected to the angle fixing stand or the angle stand, and the other end portion of the first fixing strap is exposed to the outside of the carrier through the angle stand and the vertical support and then fixed manually.

5. The fixing apparatus of claim 4, wherein a second fixing strap having a loop, which is disposed at one end portion of the second fixing strap and fastened to an upper edge portion of the trunk of the vehicle, passes through the horizontal support, and the other end portion of the second fixing strapis exposed to the outside of the carrier and then fixed manually.

6. The fixing apparatus of claim 2, wherein a U-shaped angle fixing stand is slidably installed at a right angle on the article mount, an angle stand is slidably installed on the horizontal support, a fixing groove, to which the angle fixing stand is coupled, is formed in an upper surface of the angle stand, one end portion of a first fixing strap, which holds the angle fixing stand engaging with the fixing groove so that the angle fixing stand is not moved, is connected to the angle fixing stand or the angle stand, and the other end portion of the first fixing strap is exposed to the outside of the carrier through the angle stand and the vertical support and then fixed manually.

7. The fixing apparatus of claim 3, wherein a U-shaped angle fixing stand is slidably installed at a right angle on the article mount, an angle stand is slidably installed on the horizontal support, a fixing groove, to which the angle fixing stand is coupled, is formed in an upper surface of the angle stand, one end portion of a first fixing strap, which holds the angle fixing stand engaging with the fixing groove so that the angle fixing stand is not moved, is connected to the angle fixing stand or the angle stand, and the other end portion of the first fixing strap is exposed to the outside of the carrier through the angle stand and the vertical support and then fixed manually.

* * * * *